No. 682,943. Patented Sept. 17, 1901.
B. G. LAMME.
METHOD OF CHANGING FREQUENCY OF ALTERNATING CURRENTS.
(Application filed July 24, 1897.)
(No Model.)
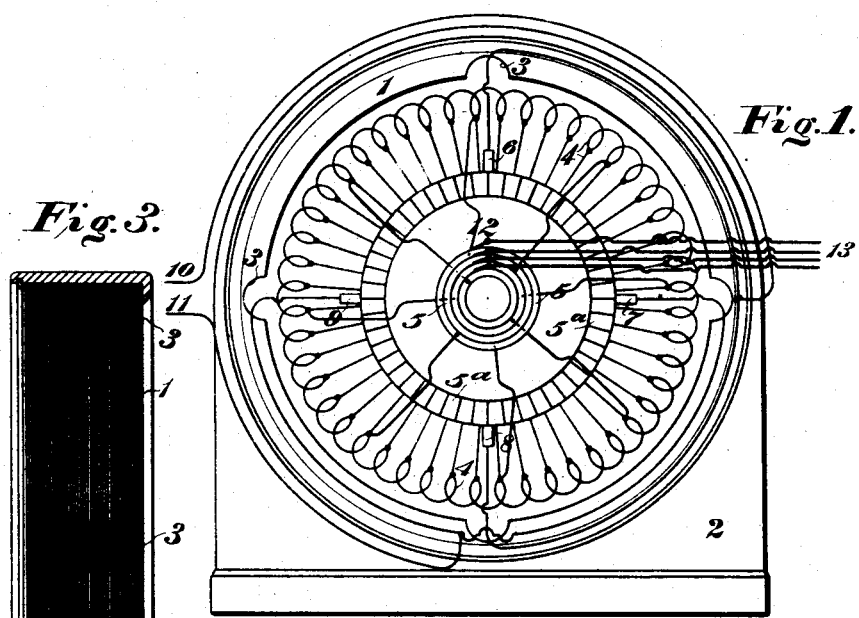
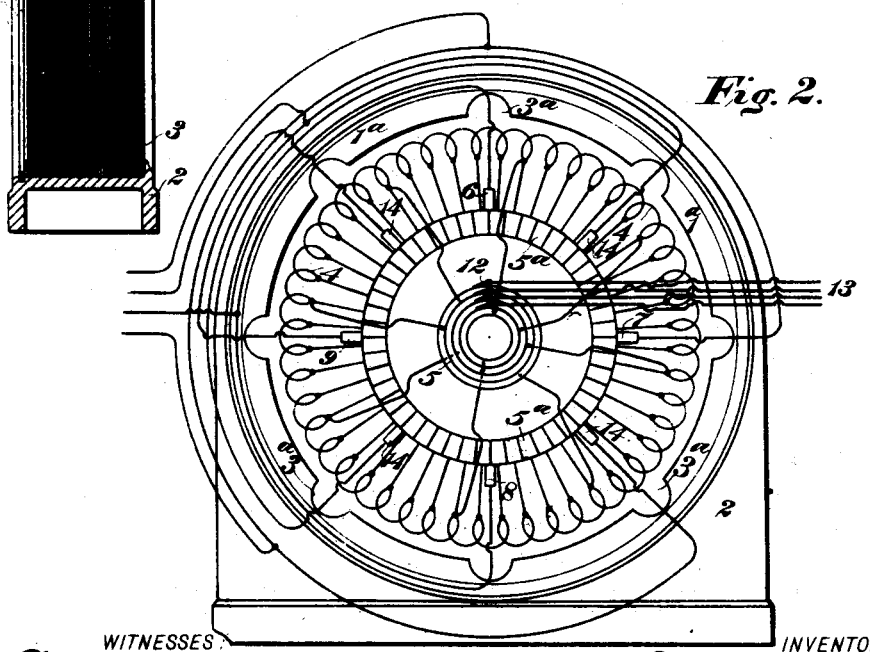
WITNESSES
INVENTOR
Benjamin G. Lamme
BY Wesley G. Carr
ATTORNEY.

UNITED STATES PATENT OFFICE.

BENJAMIN G. LAMME, OF PITTSBURG, PENNSYLVANIA, ASSIGNOR TO THE WESTINGHOUSE ELECTRIC AND MANUFACTURING COMPANY, OF PENNSYLVANIA.

METHOD OF CHANGING FREQUENCY OF ALTERNATING CURRENTS.

SPECIFICATION forming part of Letters Patent No. 682,943, dated September 17, 1901.

Application filed July 24, 1897. Serial No. 645,797. (No specimens.)

*To all whom it may concern:*

Be it known that I, BENJAMIN G. LAMME, a citizen of the United States, residing in Pittsburg, in the county of Allegheny and State of Pennsylvania, have invented a new and useful Improvement in Methods of Changing the Frequency of Alternating Currents, (Case No. 750,) of which the following is a specification.

My invention relates to alternating-current transformation; and it has for its object to provide a method of changing the frequency of alternating currents which shall be reliable and effective and which shall have a wide range of usefulness.

In the accompanying drawings, Figure 1 is a diagrammatic view of a machine for securing alternating currents of different frequencies, and Fig. 2 is a similar view of a modified form of machine. Fig. 3 is a sectional view of the laminated core of the machine shown in Fig. 1.

Referring particularly to Figs. 1 and 3, 1 is a laminated ring-core which is unprovided with magnetizing-coils and serves merely as a keeper or a return-path for the lines of force and may be mounted in a suitable supporting-frame 2. This ring 1 is provided with notches 3, the number and location of such notches depending upon the number of phases of current which it is desired to secure from the machine. The employment of such notches is necessary in order to avoid local magnetic fluxes at the points where the brushes are located. While no specific form of notches is essential, proper commutation cannot be effected without the employment of notches of some form at the points where the commutator-brushes are located.

4 is the winding of the armature of the machine, which is here indicated diagrammatically for convenience of illustration as of ring form; but in practice it would probably be of the more usual drum type. This winding is connected to suitable collector-rings 5 and also to a commutator-cylinder 5ª, on which bear brushes, the number of which corresponds to the number of phases of current. The brushes 6 and 8 being diametrically opposite each other and corresponding to one phase are electrically connected to each other and to the lead 10, and in the same manner and for the same reason the brushes 7 and 9 are connected together and to the lead 11. Two currents differing in phase are supplied to the winding of the armature 4 by means of the collecting-rings 5 and brushes 12 through the leads 13. If the armature 4 be rotated at a synchronous speed, the alternating armature-current will generate a field fixed in space, the field-ring 1, as has already been stated, serving merely as a keeper or return-path for the lines of force. When thus rotated at a synchronous speed, the brushes 6 8 and 7 9 will take off a direct current and supply the same to the leads 10 11. If the armature be run at a speed slightly below synchronism the brushes will take off an alternating current having a frequency represented by the drop in speed below synchronism. A further drop in speed will increase the frequency of the alternations delivered from the brushes to the circuit 10 11 until the armature is brought to rest, when the alternations will be equal to those supplied by the leads 13, the brushes 12, and rings 5 to the armature 4.

Referring now to Fig. 2 of the drawings, the armature 4, collecting-rings 5, commutator-cylinder 5ª, and alternating-current leads 13 are the same as those shown in Fig. 1 and above described. The laminated ring or keeper 1ª is also the same, except that it has eight notches 3ª instead of the four notches 3 of Fig. 1. There being a commutator-brush corresponding to each notch 3ª and those diametrically opposite each other being electrically connected for one phase, it will be seen that the brushes 14, which have been added between those shown in Fig. 1, will deliver alternating currents one-half an alternation behind or ahead, as the case may be, those of the other circuit. By rotating the armature at different speeds, as has already been described in connection with Fig. 1, two-phase alternating currents will be delivered which, as regards the rate of alternations, differ in any desired degree from the currents supplied to the machine. It will also be understood that the notches and corresponding brushes may be varied in number and position from those shown to secure a different number of phases of current, if desired.

In order that the operation of the apparatus in the manner described may be satisfactory, the core or keeper should be laminated and should have either the same number of notches as there are poles in the rotating field produced by the polyphase currents supplied to the winding of the rotating member of the machine or a multiple of that number, according to the number of phases of current taken from the commutator.

It is probable that the apparatus might be operated without the notched ring or keeper 1 or 1ª; but in such case the alternating magnetizing-current would be very large unless the armature had a very great number of ampere-turns. This would lead to serious sparking at the commutator, whereas with the construction and arrangement described the number of armature-turns is small and the number of turns per commutator-bar is reduced to a minimum, thus reducing the sparking to negligible limits.

I claim as my invention—

1. The method of changing the frequency of alternating currents which consists in supplying alternating currents of a given frequency, through brushes and collector-rings, to the armature-winding of a rotary transformer having a field-magnet unprovided with magnetizing-coils and running said armature at such speed between zero and synchronism as will insure the supply of currents of the desired frequency to the commutator-leads.

2. The method of producing alternating currents of any desired frequency which consists in supplying alternating currents of a given frequency to the armature-winding of a rotary transformer having no magnetizing field-coils, and driving the armature at such speed between zero and synchronism as will provide a current of the desired frequency at the commutator-brushes.

3. The method of changing the frequency of alternating currents which consists in supplying alternating currents of a given frequency to the winding of the rotatable member of an electrical machine through brushes and collector-rings, rotating said member in proximity to a magnetic keeper at a speed corresponding to the desired current frequency and taking off the transformed current through a commutator.

In testimony whereof I have hereunto subscribed my name this 22d day of July, A. D. 1897.

BENJ. G. LAMME.

Witnesses:
WESLEY G. CARR,
H. C. TENER.